(12) United States Patent
Hwang et al.

(10) Patent No.: US 8,910,213 B2
(45) Date of Patent: Dec. 9, 2014

(54) METHOD AND APPARATUS FOR TRANSFERRING USER INFORMATION BETWEEN TERMINALS IN BROADCAST STREAMING SERVICE

(75) Inventors: Seo Young Hwang, Suwon-si (KR); Kyung Mo Park, Seoul (KR); Jae Yeon Song, Seoul (KR); Kook Heui Lee, Suwon-si (KR); Doug Young Suh, Seongnam-si (KR); Gwang Hoon Park, Seongnam-si (KR); Kyuheon Kim, Seoul (KR); Sanghyun Park, Seoul (KR); Byungchul Kim, Suwon-si (KR)

(73) Assignees: Samsung Electronics Co., Ltd (KR); Kyunghee University Foundation for Corporate Collaboration (KR)

( * ) Notice: Subject to any disclaimer, the term of this patent is extended or adjusted under 35 U.S.C. 154(b) by 329 days.

(21) Appl. No.: 12/729,741

(22) Filed: Mar. 23, 2010

(65) Prior Publication Data

US 2010/0242071 A1    Sep. 23, 2010

(30) Foreign Application Priority Data

Mar. 23, 2009   (KR) .................. 10-2009-0024363

(51) Int. Cl.
| | |
|---|---|
| *G06F 3/00* | (2006.01) |
| *G06F 13/00* | (2006.01) |
| *H04N 5/44* | (2011.01) |
| *H04N 7/18* | (2006.01) |
| *H04N 21/472* | (2011.01) |
| *H04N 21/658* | (2011.01) |
| *G11B 27/11* | (2006.01) |
| *H04N 21/414* | (2011.01) |
| *H04N 7/173* | (2011.01) |
| *G11B 27/10* | (2006.01) |

(52) U.S. Cl.
CPC ..... *H04N 7/17318* (2013.01); *H04N 21/47214* (2013.01); *H04N 21/6581* (2013.01); *H04N 21/6582* (2013.01); *G11B 27/11* (2013.01); *H04N 21/41407* (2013.01); *G11B 27/105* (2013.01)
USPC ................... 725/47; 725/37; 725/44; 725/74; 725/78

(58) Field of Classification Search
USPC ......................................................... 725/91
See application file for complete search history.

(56) References Cited

U.S. PATENT DOCUMENTS

| | | | |
|---|---|---|---|
| 2003/0046691 A1* | 3/2003 | Nakagawa ...................... | 725/38 |
| 2005/0097623 A1* | 5/2005 | Tecot et al. .................... | 725/136 |
| 2007/0047909 A1 | 3/2007 | Toyama et al. | |
| 2007/0130595 A1* | 6/2007 | McElhatten et al. ............ | 725/88 |
| 2008/0155615 A1* | 6/2008 | Craner et al. .................. | 725/91 |
| 2009/0054092 A1 | 2/2009 | Stonefield et al. | |

FOREIGN PATENT DOCUMENTS

| | | |
|---|---|---|
| GB | 2 409 737 | 7/2005 |
| KR | 1020030058429 | 7/2003 |
| KR | 1020050056076 | 6/2005 |

* cited by examiner

*Primary Examiner* — Justin Shepard
(74) *Attorney, Agent, or Firm* — The Farrell Law Firm, P.C.

(57) ABSTRACT

A method and apparatus for transferring user information between different terminals are disclosed. The method includes saving by a first terminal, when a change is made to user information during playback of content, the changed user information in a scene history, performing a terminal change from the first terminal to a second terminal, and resuming, by the second terminal, playback of the content from a continued scene after the last scene played back by the first terminal. Consequently, in a terminal change, the user may use the second terminal to play back the same content from the continued scene using the same content usage environment as the first terminal.

15 Claims, 9 Drawing Sheets

METHOD AND APPARATUS FOR TRANSFERRING USER INFORMATION BETWEEN TERMINALS IN BROADCAST STREAMING SERVICE

PRIORITY

This application claims priority to an application entitled "METHOD AND APPARATUS FOR TRANSFERRING USER INFORMATION BETWEEN TERMINALS IN BROADCAST STREAMING SERVICE" filed in the Korean Intellectual Property Office on Mar. 23, 2009 and assigned Serial No. 2009-0024363, the contents of which are incorporated herein by reference.

BACKGROUND OF THE INVENTION

1. Field of the Invention

The present invention relates generally to user information transfer between different terminals in a broadcast streaming service and, more particularly, to a method and apparatus for transferring user information between different terminals in a broadcast streaming service, wherein user information of a first terminal can be transferred to a second terminal to synchronize content usage environments between the first and second terminals.

2. Description of the Related Art

Broadcasting services may be used to deliver audio, video and data to many users. Recent advances in communication technology and digital broadcasting technology have enabled delivery of various services related to real-time broadcasting, Video on Demand (VoD), and interactive applications using IP (Internet Protocol). Broadcast receivers or terminals may receive broadcast streaming contents (including audio and video) and service guides through wired and wireless channels from service providers. The broadcast receivers or terminals may also send and receive data through bi-directional channels.

A single user often employs multiple terminals. Particularly, when a user plays back a specific content with a first terminal, the user may change setting information or a scene description. Thereafter, when the user attempts to play back the same content with a second terminal, the content usage information and user setting information of the first terminal may be not known to the second terminal.

For the "one source multi-use" environment, the user may desire to play back the same content in the same manner regardless of which terminal is being used. That is, the user may desire to setup the same user environment in the first and second terminals. However, because the content usage information and user setting information of the first terminal is not transferred to the second terminal, the user may have to inconveniently play back the content from the beginning and newly create a content usage environment in the second terminal.

Hence, to enable the user to conveniently play back the same content with different terminals, it is necessary to transfer content usage information and user setting information of the previous terminal to the current terminal.

SUMMARY OF THE INVENTION

The present invention has been made in view of the above problems, and the present invention provides a method and apparatus for transfer of user information between multiple terminals to enable the user to conveniently play back the same content with different terminals.

The present invention also provides a method and apparatus that can synchronize content usage environments between multiple terminals to enable the user to play back the same content with different terminals.

In accordance with the present invention, there is provided a method of transferring user information between different terminals for playing back the same content, including saving, when a change is made to user information during content playback, by a first terminal, the changed user information in a scene history, performing terminal change from the first terminal to a second terminal, and resuming, by the second terminal after receiving the scene history, playback of the content from a continued scene after the last scene played back by the first terminal.

Performing a terminal change may include sending, by the first terminal, the scene history to a server, and sending, by the server, the content and scene history to the second terminal. Resuming playback of the content from a continued scene may include composing, by the second terminal, the continued scene after the last scene played back by the first terminal on the basis of the content and the scene history from the server, and resuming playback of the content from the continued scene.

Performing a terminal change may include sending, by the first terminal, the scene history to a server, composing, by the server, the continued scene after the last scene played back by the first terminal on the basis of the content and the scene history, and sending, by the server, the content and the continued scene to the second terminal. Resuming playback of the content may include receiving, by the second terminal, the content and the continued scene from the server, and resuming playback of the content from the continued scene.

Performing a terminal change may include sending, by the first terminal, the scene history to the second terminal. Resuming playback of the content may include receiving, by the second terminal, the content from the server, composing the continued scene after the last scene played back by the first terminal on the basis of the content and the scene history, and resuming playback of the content from the continued scene.

In accordance with the present invention, there is provided an apparatus for transferring user information between different terminals for playing back the same content, including a scene history manager for saving, upon detection of a change made to user information during playback of a content, the changed user information in a scene history, a Radio Frequency (RF) communication unit for sending, upon detection of terminal change, the scene history, and receiving a content and a scene history from an external terminal, and a continued scene composer for controlling, using the content and scene history from the external terminal, resumption of playing back the content from a continued scene after the last scene played back by the external terminal.

The RF communication unit may send the updated scene history to a server upon detection of terminal change, the RF communication unit may receive content and the scene history related to the external terminal from the server, and the continued scene composer may compose a continued scene after the last scene played back by the external terminal on the basis of the received content and the scene history and resume playback of the content from the continued scene.

The RF communication unit may send the updated scene history to a server upon detection of terminal change, the RF communication unit may receive content and a continued scene to be played back after the last scene played back by the external terminal from the server, and the continued scene composer resumes playback of the content from the continued scene.

The RF communication unit may send the updated scene history to the external terminal upon detection of terminal change, the RF communication unit may receive a content and a scene history from the external terminal, and the continued scene composer composes a continued scene to be played back after the last scene played back by the external terminal on the basis of the received content and scene history, and resumes playback of the content from the continued scene.

In the present invention, for a user desiring to play back the same content with different terminals, the content usage information and user setting information are transferred between multiple terminals, providing the same content usage environment in different terminals. In addition, the user may use a rollback function in the current terminal to alter user setting information in a reverse order of modifications made by the previous terminal in the user setting information. Hence, it is possible to increase utilization of multimedia services involving multiple terminals related to streaming and broadcasting.

BRIEF DESCRIPTION OF THE DRAWINGS

The features and advantages of the present invention will be more apparent from the following detailed description in conjunction with the accompanying drawings, in which.

DETAILED DESCRIPTION OF EMBODIMENTS OF THE INVENTION

Hereinafter, embodiments of the present invention are described in detail with reference to the accompanying drawings. The same reference symbols are used throughout the drawings to refer to the same or like parts. Detailed descriptions of well-known functions and structures incorporated herein may be omitted for the sake of clarity and conciseness.

In the description, the "first" terminal refers to a terminal that is used by a user to play back particular content before terminal change, and the "second" terminal refers to another terminal that is used by the user to play back the same content after terminal change.

The "user information" may include user setting information and content information. The user setting information may include scene description information, such as display location and display size in relation to a content, and activation, display location and display size in relation to items other than the content. The content information may refer to information on a particular content, receivable from a server, such as content identifier, play time, and remaining play time. The user information may be saved in the form of a user profile, and be referred to as a scene history.

Hereinafter, a description is given of a method in which user setting information and content information of the first terminal is saved as a user profile (scene history) and transferred to the second terminal to thereby maintain the same content usage environment in the first and second terminals.

The present invention is described using a scheme involving user information transfer between terminals in a broadcast streaming service. However, the present invention is not limited only to the broadcast streaming service, and may be applied to any services based on user information transfer between terminals playing back the same content.

Figure 1:
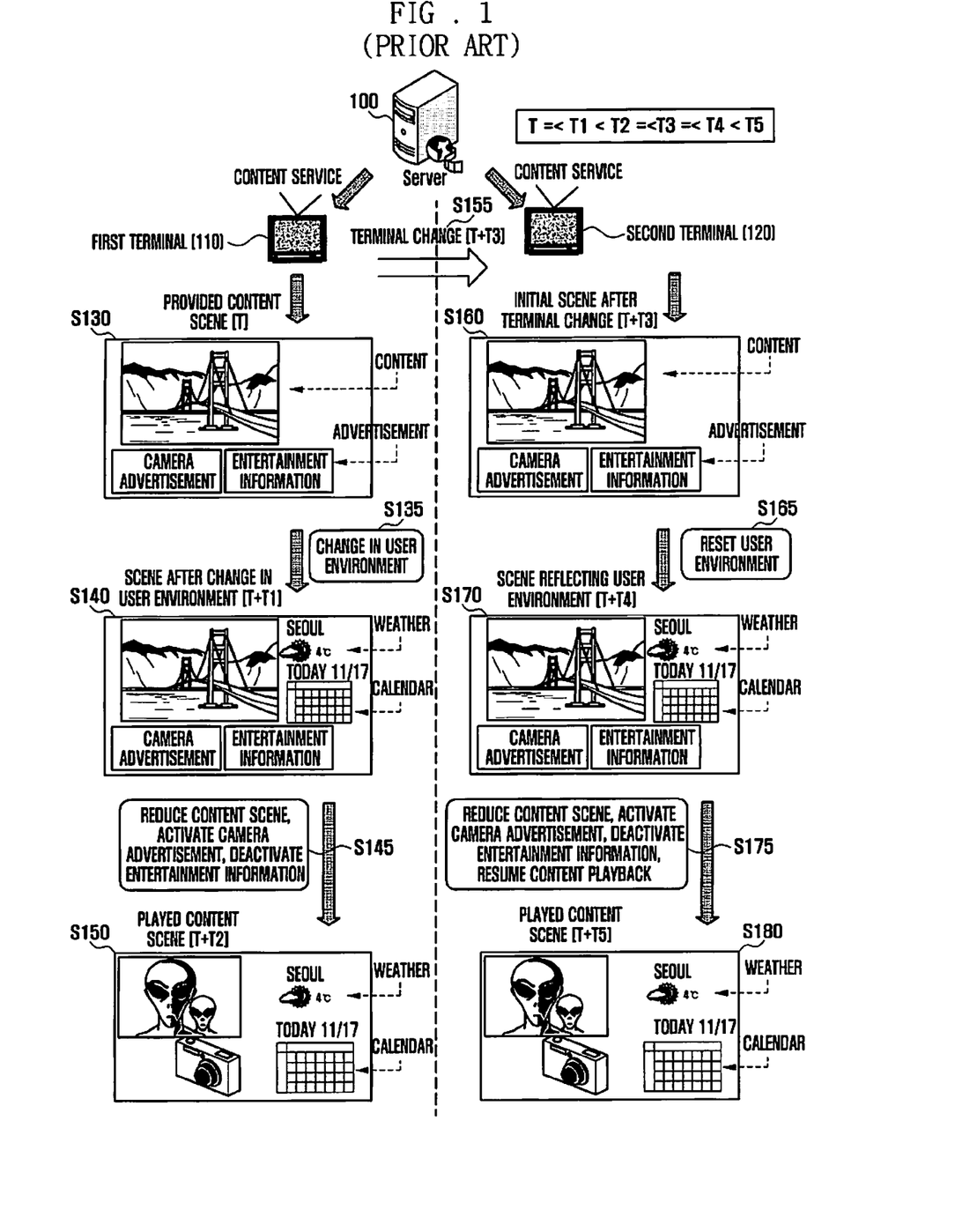
FIG. 1 illustrates a problem associated with an existing broadcast streaming scheme involving first and second terminals, according to the prior art.

FIG. 1 illustrates a problem associated with an existing broadcast streaming scheme involving a first terminal 110 and a second terminal 120 playing back the same content. In FIG. 1, the symbol 'T' denotes a point in time, and the progress of time is indicated by the sign of inequality.

Referring to FIG. 1, the first terminal 110 receives content from a server 100 and displays the content (S130). The first terminal 110 may display received content according to user setting information set in advance. For example, the first terminal 110 may display a content scene and an advertisement item (a camera advertisement or entertainment information) at a given location and size according to the user setting information as depicted by the presentation at step S130.

When the user setting information is changed to display, for example, a weather item and calendar item near the content scene (S135), the first terminal 110 displays the content scene according to the changes in the user setting information (S140). In addition, when the screen composition is changed through user interaction during content display (S145), the first terminal 110 displays the content according to the changed screen composition (S150). As illustrated at step S145, the screen composition is changed to reduce the content scene, activate the camera advertisement, and deactivate the entertainment information.

The first terminal 110 records the changes made to the user setting information as history while in operation (S130 to S150). Later, the user may undo the changes made to the user setting information in reverse order through the rollback function of the first terminal 110.

For terminal change, the user begins using the second terminal 120 to play back the content (S155). The second terminal 120 receives the content from a server 100, and displays the content according to user setting information stored therein (S160).

That is, when the user uses the second terminal 120 to playback the same content, the second terminal 120 displays the content according to user setting information stored therein, not according to the user setting information of the first terminal 110. To play back the content under the same environment as that of the first terminal 110, the user must direct the second terminal 120 to perform steps S165 to S180, which correspond respectively to steps S135 to S150 for the first terminal 110, and are not described further for the sake of conciseness.

The second terminal 120 plays back the content from the beginning regardless of content usage status at the first terminal 110. In other words, the second terminal 120 may be unable to resume playback of the content from the scene at which the first terminal 110 paused playback due to a terminal change.

In summary, when content is played back by the first terminal 110 and the user begins using the second terminal 120 to play back the content, the first terminal 110 may be unaware of the user setting information and content information of the first terminal 110. Consequently, the second terminal 120 may be incapable of setting the same content usage environment as that of the first terminal 110, and may have to play back the content from the beginning of the content.

Next, a description is given of a method in which user setting information and content information of the first terminal is saved and transferred to the second terminal to thereby synchronize content usage environments between different terminals.

Figure 2:
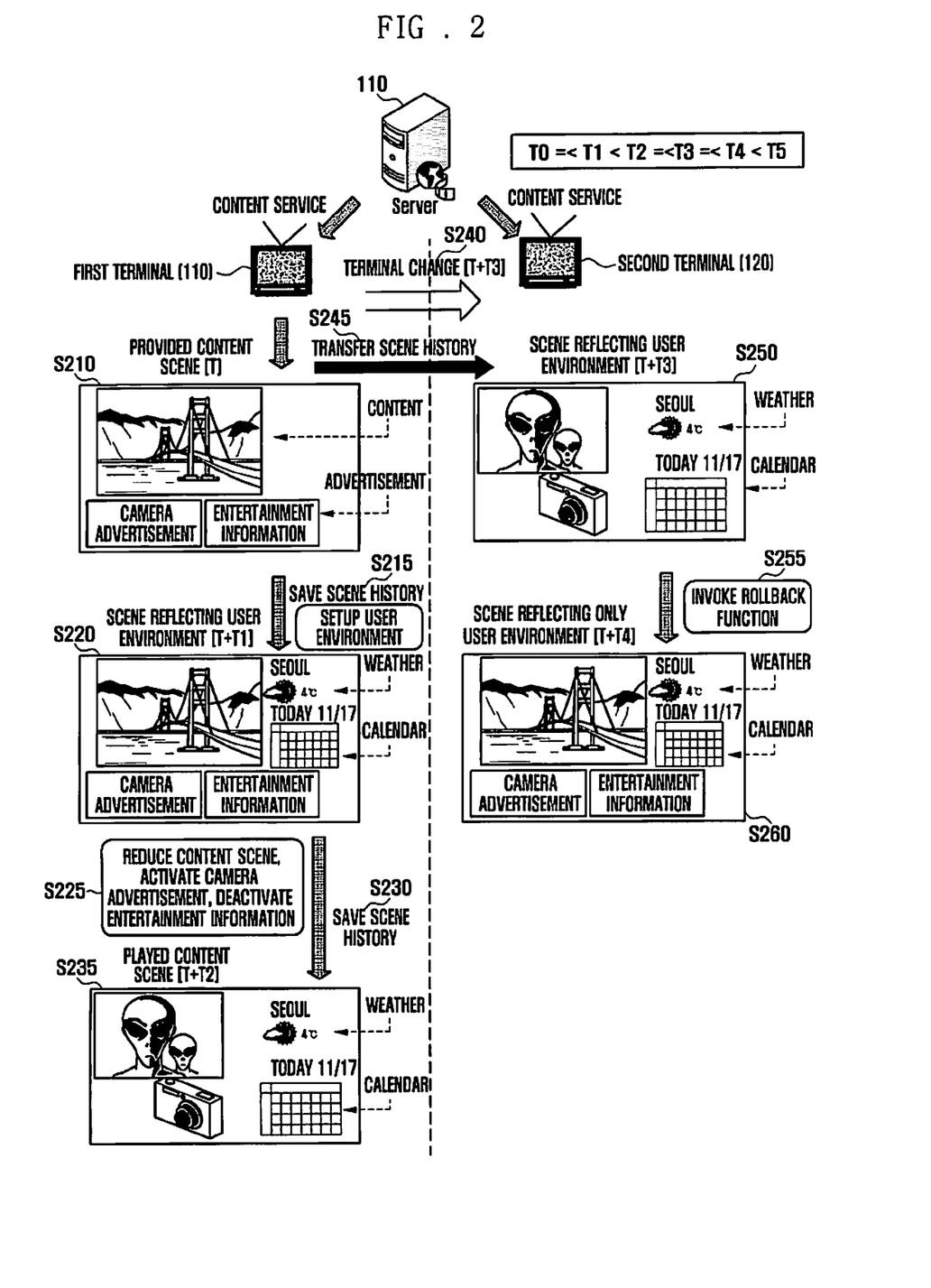
FIG. 2 illustrates a content utilization method involving first and second terminals, in which the second terminal plays back content in consideration of user setting information and content usage information set by the first terminal, according to the present invention.

FIG. 2 illustrates a content utilization method involving first and second terminals 110 and 120, in which the second terminal 120 plays back content in consideration of user setting information and content usage information set by the first terminal 110, according to the present invention. During content playback, the first terminal 110 records events such as scene changes and changes in the user setting information in the scene history at regular intervals. In FIG. 2, as in FIG. 1, the symbol 'T' denotes a point in time, and the progress of time is indicated by the sign of inequality.

Referring to FIG. 2, the first terminal 110 receives content from a server 100 and displays the content (S210). The first terminal 110 may display received content according to user setting information set in advance, as described in connection with FIG. 1.

When the user setting information is changed so as to display, for example, a weather item and calendar item near the content scene, the first terminal 110 records the changes in the scene history (S215), and displays the content scene according to the changes in the user setting information (S220).

When the screen composition or content information is altered during content playback (S225), the first terminal 110 records the changes in the scene history (S230), and displays the content according to the changed screen composition and content information (S235).

For terminal change, when the user begins using the second terminal 120 to play back the content (S240), the first terminal 110 transfers the scene history directly or via the server 100 to the second terminal 120 (250).

Upon reception of the scene history from the first terminal 110, the second terminal 120 may obtain the user information (user setting information and content information) of the first terminal 110. Hence, the second terminal 120 may setup the same content usage environment as that of the first terminal 110 on the basis of the scene history.

In other words, at step S250, the second terminal 120 may set up the screen composition as in the first terminal 110 on the basis of the user setting information in the received scene history, and resume playback of the content from the scene at which the first terminal 110 paused playback on the basis of the content information in the received scene history.

In the present invention, a terminal may return to a desired previous scene in content using the rollback function on the basis of the scene history received from another terminal. For example, when the user invokes the rollback function (S255), the second terminal 120 may recover a content usage environment set prior to the current usage environment (S260).

The scene history is updated in response to the occurrence of an event, such as a change of scene in the content and a change in the user setting information. The scene history may be defined according to Table 1, as follows.

TABLE 1

Scene History

Syntax
Scenehistory ( ) {
Uint user_ID;
Uint Time2Save;
Data Current_SceneDescription_Info;
Data Current_User_Display_preference;
Data Current_Contents_Media_Info;
}
Semantics
User_ID: unique identifier for the user
Time2Save: the time the history is saved
Current_User_Display_preference: current user screen composition information
Current_SceneDescription_Info: scene description information of current content scene
Current_Contents_Media_Info: content ID and usage information (play time and the like) associated with current scene As shown in Table 1, the scene history may include user identification information such as an authentication key, timing information of the screen to be saved, screen composition information reflecting user settings, scene description information of the content to be saved, and content information associated with the current scene.

The user setting information may include the scene description information of the content and the screen composition information. The content information may include a content ID and usage information items associated with the current scene.

Figure 3:
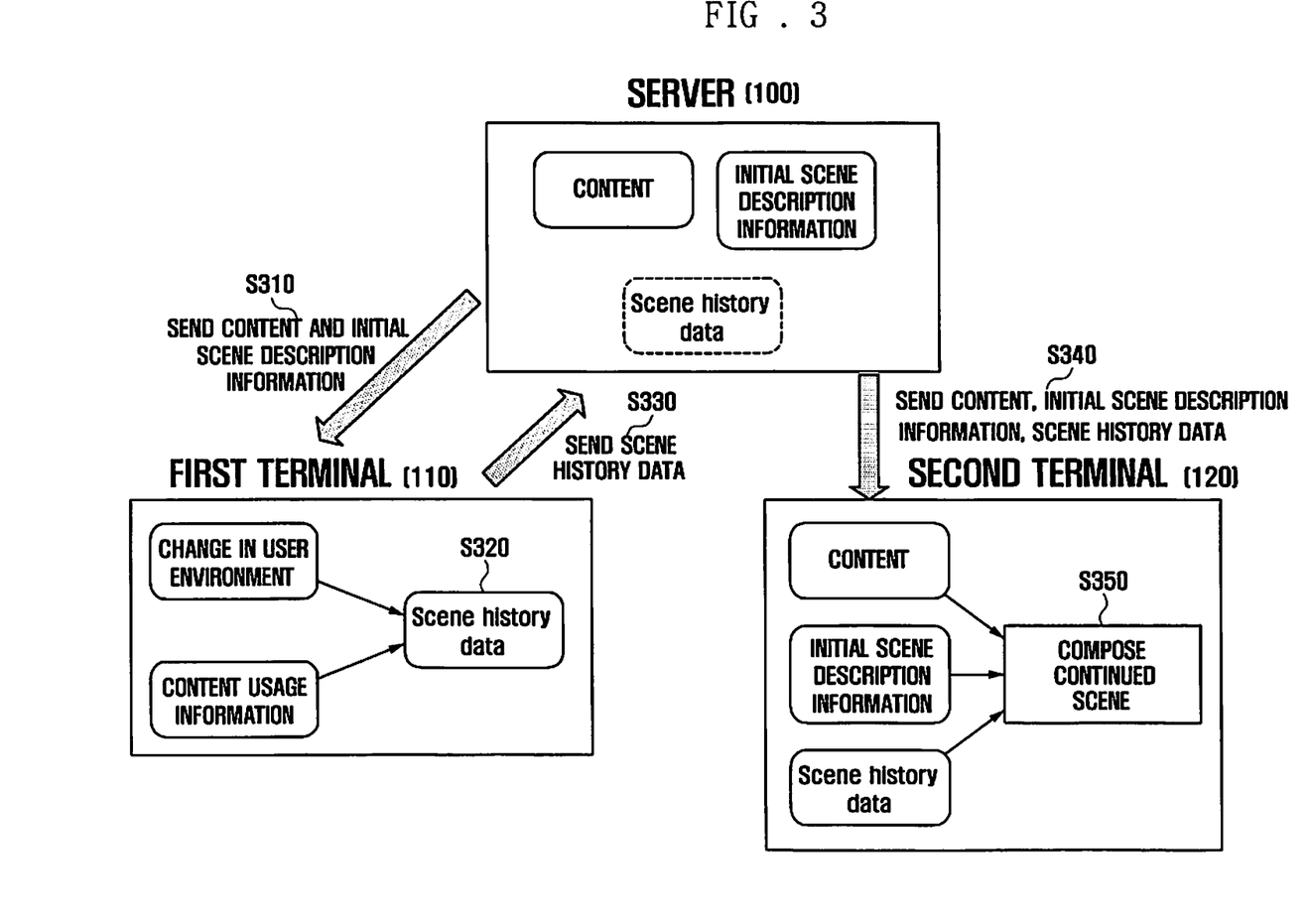
FIG. 3 illustrates a procedure for the first terminal to transfer scene history data to the second terminal according to a first embodiment of the present invention.

FIG. 3 illustrates a procedure for the first terminal to transfer scene history data to the second terminal according to a first embodiment of the present invention.

Referring to FIG. 3, the server 100 sends requested content and initial scene description information of the content to the first terminal 110 (S310). Thereafter, the first terminal 110 may compose the initial scene according to the initial scene description information, and play back the received content.

When a change is made to the user setting information or to the content information (for example, progress of content playback), the first terminal 110 saves the changed user setting information or content information in the scene history (S320). For example, the user setting information may be updated when the user changes the display size or display location of the content. The content information may be updated when content usage parameters are changed or the content is altered with the progress of playback. Update of the user setting information or the content information is not limited to the above conditions, and may be triggered by other conditions, if necessary.

When the user performs a terminal change, the first terminal 110 sends the scene history to the server 100 (S330). Upon reception of a content request from the second terminal 120, the server 100 sends the same content as that for the first terminal 110, the initial scene description information of the content, and the received scene history to the second terminal 120 (S340).

Thereafter, the second terminal 120 composes a continued scene for display on the basis of the content, the initial scene description information of the content, and the scene history received from the server 100 (S350). The continued scene is composed under the same content usage environments as those of the first terminal 110 immediately before terminal change.

As described above, the second terminal 120 composes a continued scene following those of the first terminal 110 by applying the scene history to the initial scene composed using the content and the initial scene description information of the content. Alternatively, the continued scene may be composed directly from the content and scene history.

As described above, the user may use the second terminal 120 after the first terminal 110 for continued content playback in the case of a terminal change. The second terminal 120 may be aware of changes made by the first terminal 110 to the user setting information on the basis of the scene history. Hence, the user may invoke the rollback function of the second terminal 120 to recover a previous content usage environment in reverse order of changes made by the first terminal 110 to the user setting information.

Figure 4:
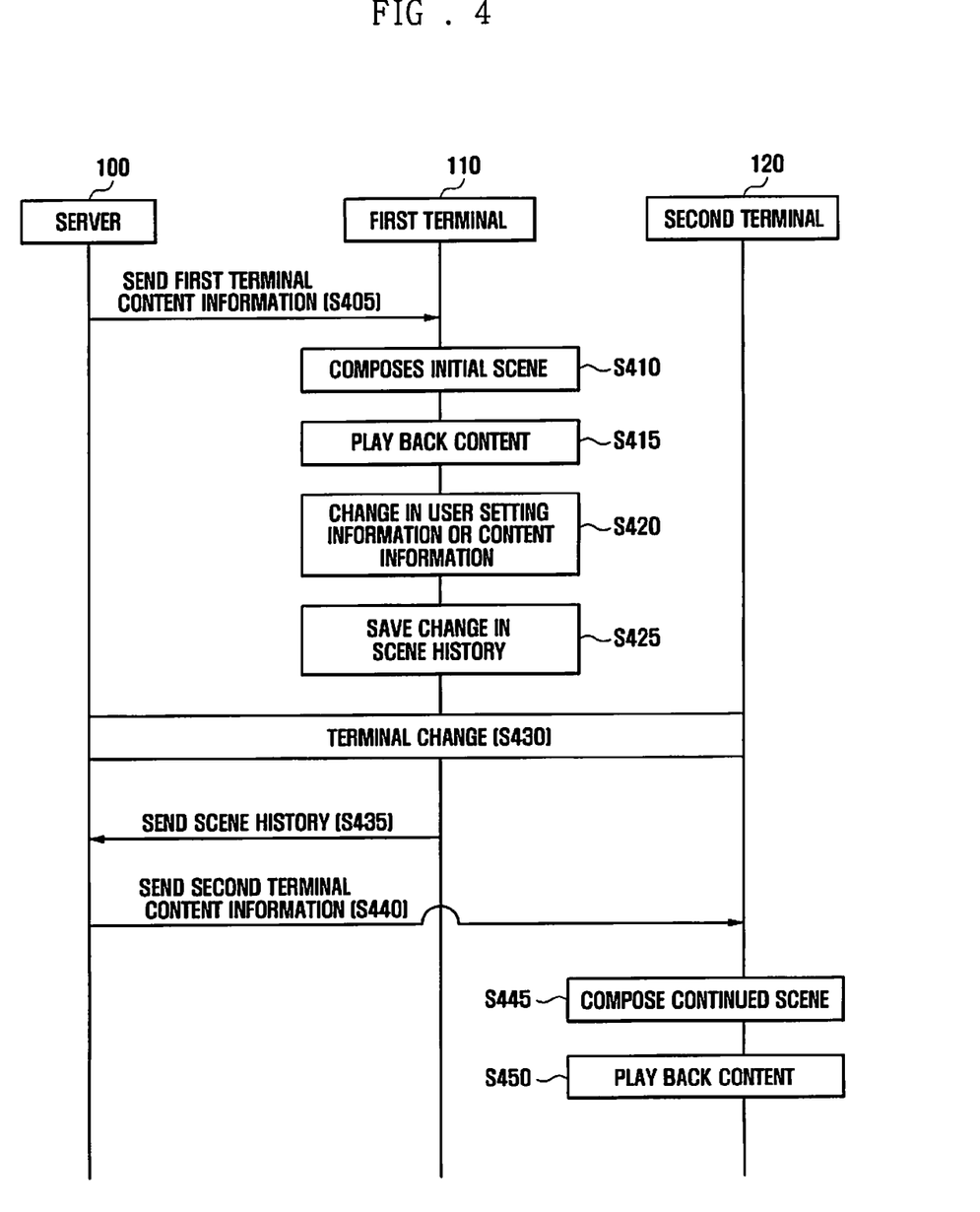
FIG. 4 illustrates a sequence of the first embodiment of the procedure for the first terminal to transfer scene history data to the second terminal.

FIG. 4 illustrates a sequence of the first embodiment of the procedure for the first terminal to transfer scene history data to the second terminal.

Referring to FIG. 4, the first terminal 110 receives first terminal content information from the server 100 (S405). Here, the first terminal content information is information necessary for content playback in the first terminal 110, and includes a requested content and initial scene description information of the content described before in connection with FIG. 3. Thereafter, the first terminal 110 composes the initial scene according to the initial scene description information (S410), and plays back the received content (S415).

When a change is made to the user setting information or to the content information (S420), the first terminal 110 saves the changed user setting information or content information in the scene history (S425). When the user performs terminal change to the second terminal 120 (S430), the first terminal 110 sends the scene history to the server 100 (S435).

The server 100 sends second terminal content information to the second terminal 120 (S440). The second terminal content information is necessary for content playback in the second terminal 110, and includes the content, the initial scene description information of the content, and the scene history. Thereafter, the second terminal 120 composes a continued scene for display on the basis of the content, the initial scene description information of the content, and the scene history received from the server 100 (S445). The continued scene is composed under the same content usage environments as those of the first terminal 110 immediately before terminal change.

Consequently, the user may use the second terminal 120 to play back the same content in the same content usage environments as those of the first terminal 110 (S450).

Figure 5:
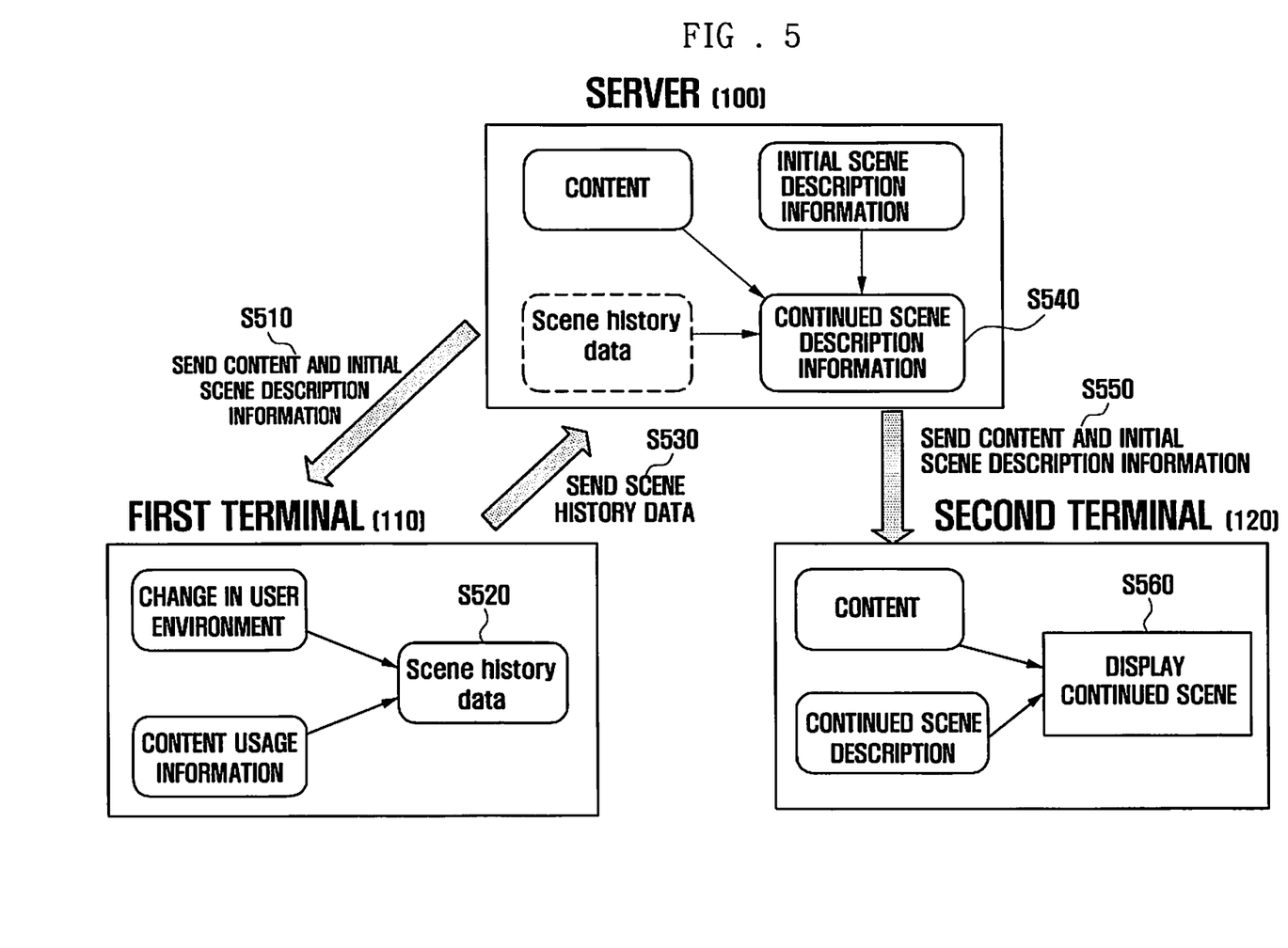
FIG. 5 illustrates a procedure for the first terminal to transfer scene history data to the second terminal according to a second embodiment of the present invention.

FIG. 5 illustrates a procedure for the first terminal to transfer scene history data to the second terminal according to a second embodiment of the present invention.

Referring to FIG. 5, the server 100 sends requested content and initial scene description information of the content to the first terminal 110 (S510). Thereafter, the first terminal 110 may compose the initial scene according to the initial scene description information, and play back the received content.

When a change is made to the user setting information or to the content information, the first terminal 110 saves the changed user setting information or content information in the scene history (S520).

When the user performs a terminal change, the first terminal 110 sends the scene history to the server 100 (S530). Upon reception of the scene history from the first terminal 110, the server 100 composes a continued scene for the second terminal 120 on the basis of the content, the initial scene description information of the content, and the scene history received from the first terminal 110 (S540). That is, the continued scene for the second terminal 120 is composed by the server 100.

Upon reception of a content request from the second terminal 120, the server 100 sends the content and continued scene description information to the second terminal 120 (S550). The second terminal 120 resumes playback of the content from the continued scene according to the continued scene description information (S560).

Figure 6:
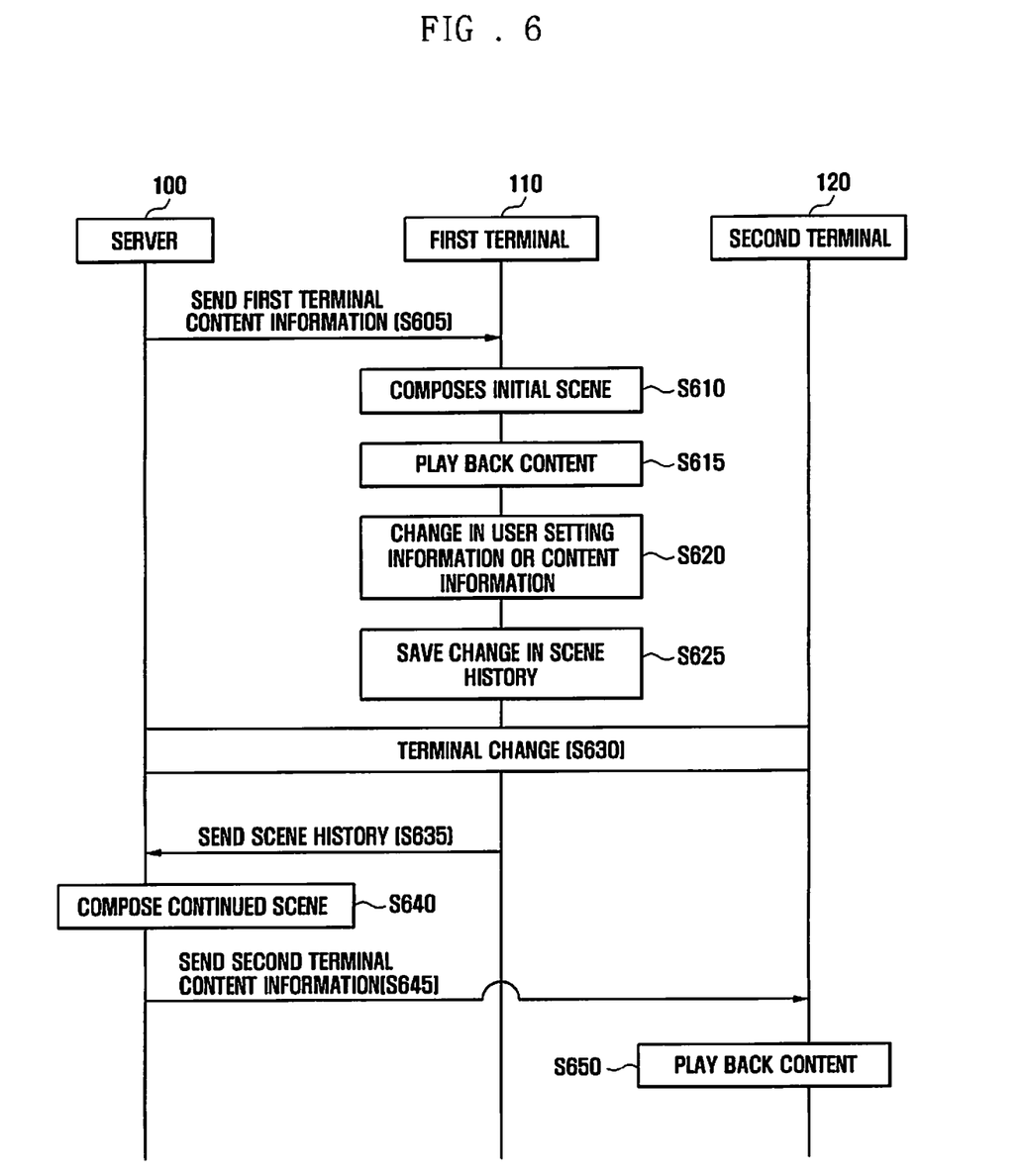
FIG. 6 illustrates a sequence of the second embodiment of the procedure for the first terminal to transfer scene history data to the second terminal.

FIG. 6 illustrates a sequence of the second embodiment of the procedure for the first terminal to transfer scene history data to the second terminal.

Referring to FIG. 6, the first terminal 110 receives first terminal content information from the server 100 (S605). The first terminal content information is necessary for content playback in the first terminal 110, and includes requested content and initial scene description information of the content. Thereafter, the first terminal 110 composes the initial scene according to the initial scene description information (S610), and plays back the received content (S615).

When a change is made to the user setting information or to the content information (S620), the first terminal 110 saves the changed user setting information or content information in the scene history (S625). When the user performs terminal change to the second terminal 120 (S630), the first terminal 110 sends the scene history to the server 100 (S635).

The server 100 composes a continued scene for the second terminal 120 on the basis of the scene history received from the first terminal 110 (S640). Upon reception of a content request from the second terminal 120, the server 100 sends second terminal content information to the second terminal 120 (S645). The second terminal content information is necessary for content playback in the second terminal 120, and includes the content and continued scene description information.

The second terminal 120 resumes playback of the content from the continued scene according to the continued scene description information (S650).

Figure 7:
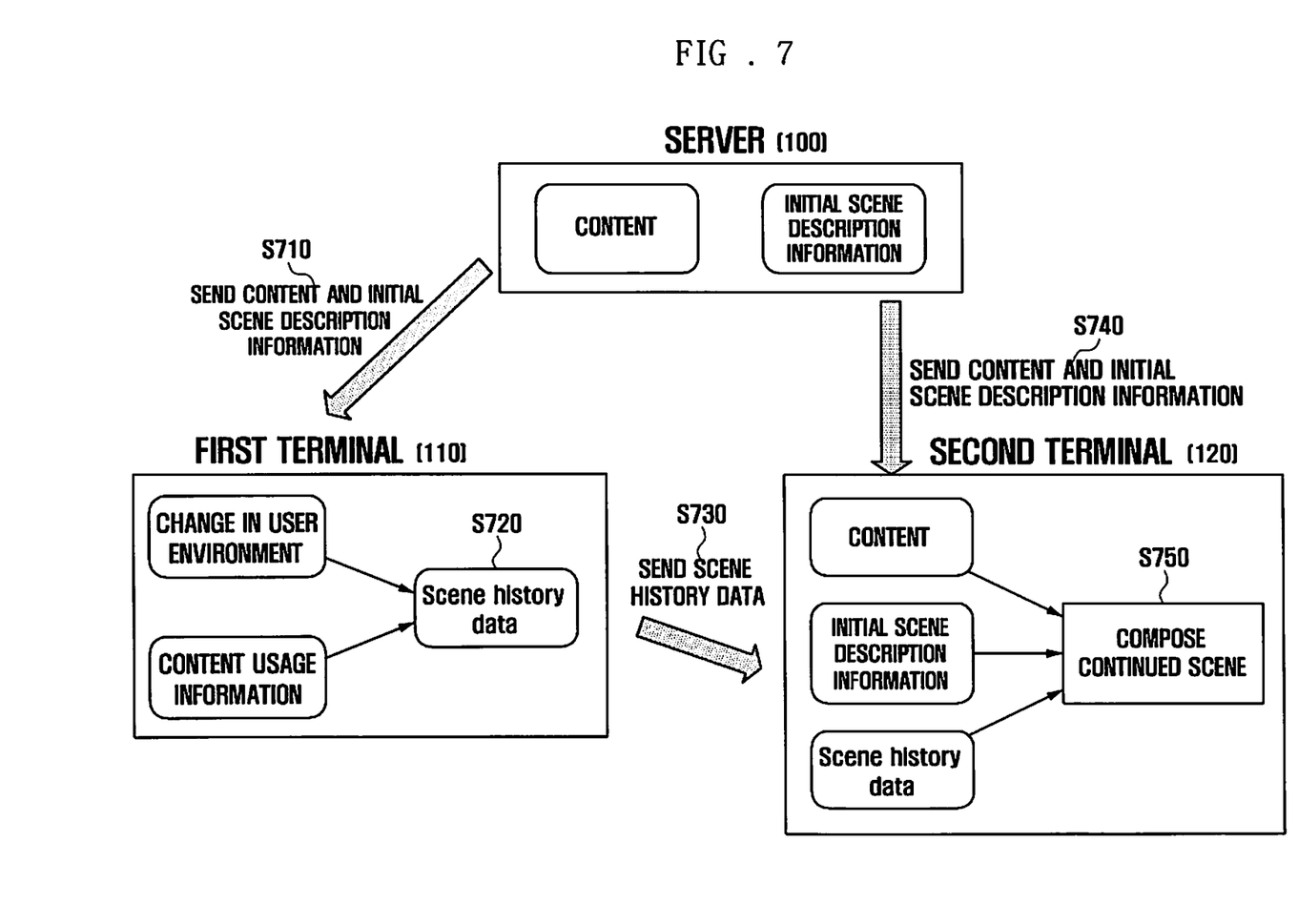
FIG. 7 illustrates a procedure for the first terminal to transfer scene history data to the second terminal according to a third embodiment of the present invention.

FIG. 7 illustrates a procedure for the first terminal to transfer scene history data to the second terminal according to a third embodiment of the present invention.

Referring to FIG. 7, the server 100 sends requested content and initial scene description information of the content to the first terminal 110 (S710). Thereafter, the first terminal 110 may compose the initial scene according to the initial scene description information, and play back the received content.

When a change is made to the user setting information or to the content information, the first terminal 110 saves the changed user setting information or content information in the scene history (S720).

When the user performs a terminal change to the second terminal 120, the first terminal 110 sends the scene history to the second terminal 120 (S730).

Alternatively, the first terminal 110 may send an address of the saved scene history to the second terminal 120 instead of the scene history itself (not shown). Here, the address may be a Uniform Resource Locator (URL). The second terminal 120 may obtain the scene history from the first terminal 110 using the received address.

In this embodiment, the first terminal 110 may utilize wireless communication such as short-range wireless communication and RF radio communication to send the scene history (or the address thereof) to the second terminal 120. Bluetooth®, infrared (IrDA) or Zigbee® communication may be used for short-range wireless communication.

Upon reception of a content request from the second terminal 120, the server 100 sends the content and initial scene description information to the second terminal 120 (S740). The second terminal 120 composes a continued scene for display on the basis of the content and the initial scene description information from the server 100, and the scene history from the first terminal 110, and resumes playback of the content from the continued scene (S750).

Figure 8:
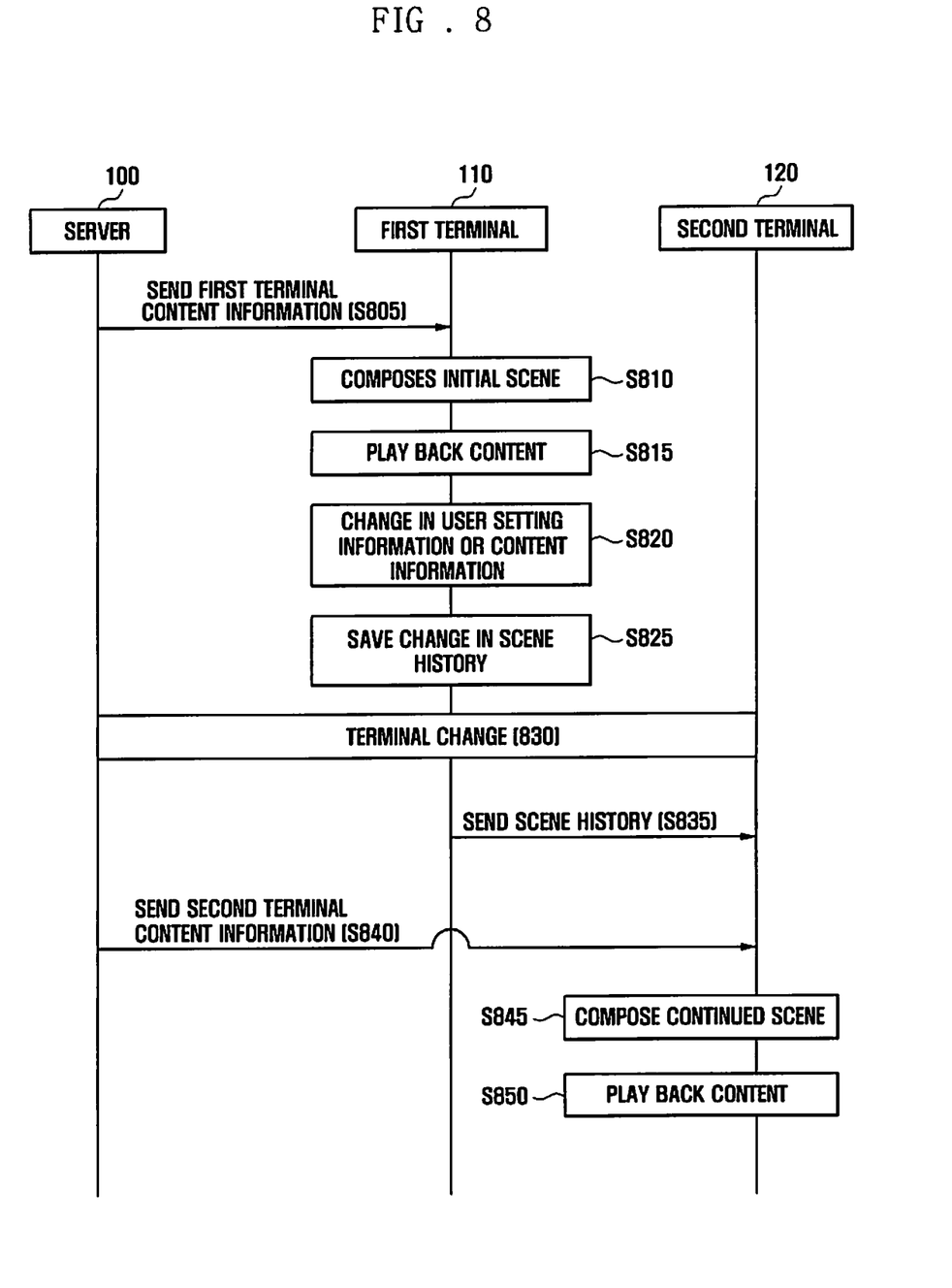
FIG. 8 illustrates a sequence of the third embodiment of the procedure for the first terminal to transfer scene history data to the second terminal.

FIG. 8 illustrates a sequence of the third embodiment of the procedure for the first terminal to transfer scene history data to the second terminal.

Referring to FIG. 8, the first terminal 110 receives first terminal content information from the server 100 (S805). Here, as previously described, the first terminal content information includes requested content and initial scene description information of the content. Thereafter, the first terminal 110 composes the initial scene according to the initial scene description information (S810), and plays back the received content (S815).

When a change is made to the user setting information or to the content information (S820), the first terminal 110 saves the changed user setting information or content information in the scene history (S825). When the user performs terminal change to the second terminal 120 (S830), the first terminal 110 sends the scene history directly to the second terminal 120 (S835). Here, as previously described, the first terminal 110 may send an address to the saved scene history to the second terminal 120 instead of the scene history itself, and the second terminal 120 may obtain the scene history from the first terminal 110 using the received address. Upon reception of a content request from the second terminal 120, the server 100 sends second terminal content information to the second terminal 120 (S840). The second terminal content information includes the content and initial scene description information thereof.

The second terminal 120 composes a continued scene for display on the basis of the content and the initial scene description information from the server 100, and the scene history from the first terminal 110 (S845), and resumes playback of the content from the continued scene (S850).

Figure 9:
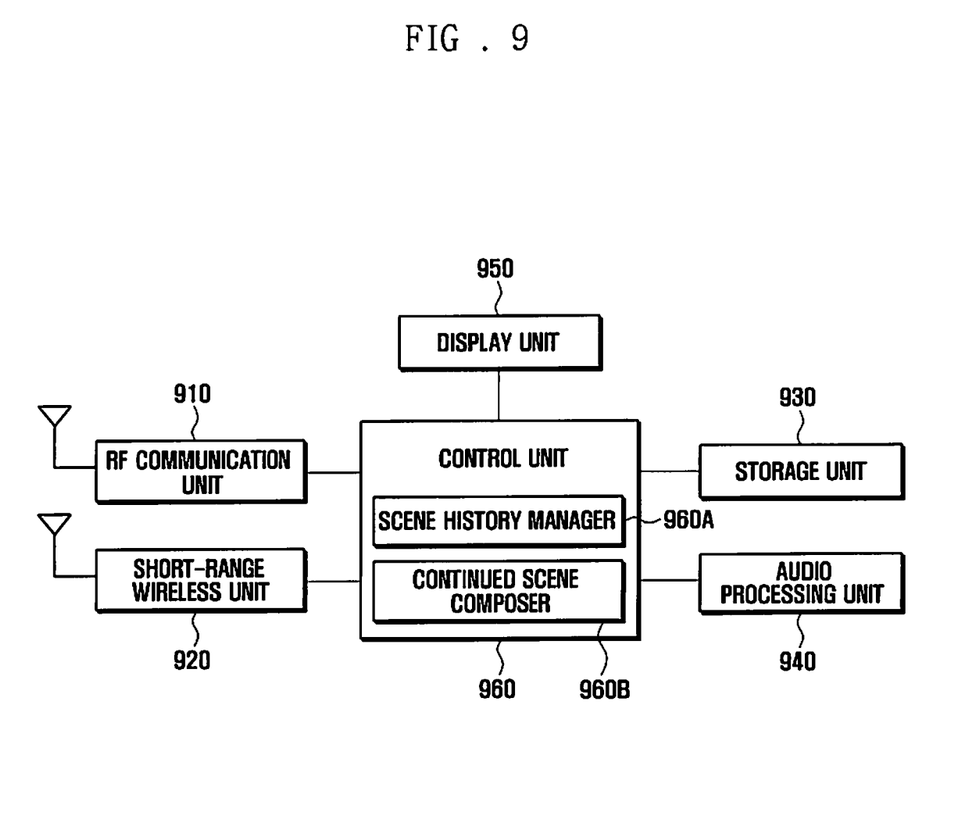
FIG. 9 illustrates a terminal according to an embodiment of the present invention.

FIG. 9 illustrates a terminal according to an embodiment of the present invention. The terminal of FIG. 9 may act as the first terminal 110 or the second terminal 120. The terminal may include an RF communication unit 910, a short-range wireless unit 920, a storage unit 930, an audio processing unit 940, a display unit 950, and a control unit 960. The control unit 960 may include a scene history manager 960A and a continued scene composer 960B.

The RF communication unit 910 may include a transceiver and a duplexer, to send a request to and receive content from the server 100. In the case of a terminal change, the RF communication unit 910 may send and receive a scene history.

The short-range wireless unit 920 may include a short-range wireless transmitter and short-range wireless receiver to communicate with another terminal capable of short-range wireless communication. Bluetooth®, infrared (IrDA) or Zigbee® communication may be used for short-range wireless communication. In particular, the short-range wireless unit 920 may receive a scene history from the first terminal 110.

The storage unit 930 may store programs and data necessary for the overall operation of the terminal.

The audio processing unit 940 may include a microphone for audio signal input and a speaker for audio signal output.

The display unit 950 may include Liquid Crystal Display (LCD) devices, and display various visual data and operation status data generated from the terminal on the screen. When the display unit 950 has a touch screen capability, it may also act as an input means.

For initial content playback, the display unit 950 may compose the initial scene on the basis of content and initial scene description information from the server 100, and play back the content. The display unit 950 may compose the screen presentation according to user setting information.

The control unit 960 may control the overall operation of the terminal supporting a broadcast streaming service, and control signal exchange between internal blocks thereof. The control unit 960 may control an operation to compose a continued scene on the basis of the content and continued scene description information from the server 100, and to resume playback of the content from the continued scene. In particular, the control unit 960 may include a scene history manager 960A and a continued scene composer 960B.

The scene history manager 960A updates the scene history in response to the occurrence of an event such as a change of scene in the played content and a change made by the user to the user setting information. For example, upon detection of a change in the content information due to the progress of playback of a content received from the server 100, the scene history manager 960A updates the scene history accordingly. Upon detection of a modification in the user setting information due to a change in the screen presentation (for example, a change in the display size, rate, or location of a scene or advertisement item on the display unit 950), the scene history manager 960A updates the scene history accordingly.

Upon detection of terminal change, the scene history manager 960A controls the RF communication unit 910 or the short-range wireless unit 920 to send the scene history to the server 100 or the second terminal 120.

Management and update of the scene history performed by the scene history manager 960A may be commonly applied to the above-described embodiments of the present invention.

The continued scene composer 960B receives content to be played back and a scene history from the previous terminal, composes a continued scene, and resumes playback of the content from the continued scene. To this end, the continued scene composer 960B composes the continued scene on the basis of the playback location in the content and user setting information of the previous terminal extracted from the received scene history. As previously described, the scene history may be received directly or via the server 100 from the previous terminal. When a continued scene is composed by the server 100 and transferred to the terminal, the continued scene composer 960B does not have to separately compose the continued scene.

As apparent from the above description, in the case of a terminal change from the first terminal 110 to the second terminal 120, the user may use the second terminal 120 for continuous playback of the same content. In addition, the user may invoke the rollback function of the second terminal 120 to recover a previous content usage environment in reverse order of changes made by the first terminal 110 to the user setting information.

Although embodiments of the present invention have been described in detail hereinabove, it should be understood that many variations and modifications of the basic inventive concept herein described, which may appear to those skilled in the art, will still fall within the spirit and scope of the embodiments of the present invention as defined in the appended claims.

What is claimed is:

1. A method of playing back the same content at a second terminal using transferred user information from a first terminal, comprising:
receiving changed user information in a scene history comprising user setting information and content information, the changed user information being generated and saved by the first terminal when a change is made to the user information during playback of content at the first terminal;
setting up a screen composition as in the first terminal based on the user setting information in the received scene history;
resuming, after receiving the scene history from the first terminal, playback of the content from a continued scene after a last scene played back by the first terminal based on the content information in the received scene history; and
invoking a rollback function to alter the user setting information in a reverse order of modifications made by the first terminal in the user setting information.

2. The method of claim 1, wherein the second terminal receives the scene history from the first terminal via a server.

3. The method of claim 2, wherein resuming playback of the content from a continued scene comprises:
composing the continued scene after the last scene played back by the first terminal on the basis of the content and the scene history from the server; and
resuming playback of the content from the continued scene.

4. The method of claim 1, wherein the second terminal receives the scene history from the first terminal via a server and the continued scene after the last scene played back by the first terminal is composed by the server on the basis of the content and the scene history.

5. The method of claim 4, wherein resuming playback of the content comprises receiving the content and the continued scene from the server, and resuming playback of the content from the continued scene.

6. The method of claim 1, further comprising receiving the scene history or an address to the saved scene history from the first terminal.

7. The method of claim 6, wherein resuming playback of the content comprises:
receiving the content from the server;
composing the continued scene after the last scene played back by the first terminal on the basis of the content and the scene history; and
resuming playback of the content from the continued scene.

8. The method of claim 6, wherein resuming playback of the content comprises:
receiving the content from the server;
obtaining the scene history using the address of the scene history;
composing the continued scene after the last scene played back by the first terminal on the basis of the scene history; and
resuming playback of the content from the continued scene.

9. An apparatus for transferring user information between different terminals for playing back the same content, comprising:
a scene history manager for saving upon detection of a change made to user information during playback of a content, the changed user information in a scene history comprising user setting information and content information;
a Radio Frequency (RF) communication unit for sending, upon detection of terminal change, the scene history to a server, and receiving a content and a scene history from an external minable; and
a continued scene composer for setting up a screen composition as in the external terminal based on the user setting information in the received scene history, resuming playback of the content from a continued scene after a last scene played back by the external terminal based on the content information in the received scene history, and invoking a rollback function to alter the user setting information in a reverse order of modifications made by the first terminal in the user setting information.

10. The apparatus of claim 9, wherein when the RF communication unit sends the updated scene history to a server, the server forwards the scene history to the external terminal.

11. The apparatus of claim 9, wherein the RF communication unit receives content and a scene history from a server, and wherein the continued scene composer composes a continued scene after the last scene played back by the external terminal on the basis of the received content and the scene history and resumes playback of the content from the continued scene.

12. The apparatus of claim 9, wherein the RF communication unit receives content and a continued scene to be played back after the last scene played back by the external terminal from a server, and wherein the continued scene composer resumes playback of the content from the continued scene.

13. The apparatus of claim 9, wherein the RF communication unit sends the updated scene history or an address to the saved scene history to the external terminal.

14. The apparatus of claim 9, wherein the RF communication unit receives content from a server and receives a scene history from the external terminal, and wherein the continued scene composer composes a continued scene to be played back after the last scene played back by the external terminal, and resumes playback of the content from the continued scene.

15. The apparatus of claim 9, wherein the RF communication unit receives content from a server and obtains a scene history using an address from the external terminal, and wherein the continued scene composer composes a continued scene to be played back after the last scene played back by the external terminal, and resumes playback of the content from the continued scene.

* * * * *